US009639533B2

(12) United States Patent
Wood et al.

(10) Patent No.: US 9,639,533 B2
(45) Date of Patent: *May 2, 2017

(54) GRAPHIC USER INTERFACE FOR A GROUP OF IMAGE PRODUCT DESIGNS

(71) Applicant: Shutterfly, Inc., Redwood City, CA (US)

(72) Inventors: Eric Ross Baker Wood, Menlo Park, CA (US); Benjamin C. Guthrie, Sunnyvale, CA (US); Moshe Bercovich, Haifa (IL); Eran Cohen, Haifa (IL); Mor Steinberg, Haifa (IL); Shai Shiloni, Haifa (IL); Yohann Sabbah, Haifa (IL)

(73) Assignee: Shutterfly, Inc., Redwood City, CA (US)

(*) Notice: Subject to any disclaimer, the term of this patent is extended or adjusted under 35 U.S.C. 154(b) by 433 days.

This patent is subject to a terminal disclaimer.

(21) Appl. No.: 14/036,329

(22) Filed: Sep. 25, 2013

(65) Prior Publication Data
US 2015/0082233 A1    Mar. 19, 2015

Related U.S. Application Data

(63) Continuation-in-part of application No. 14/030,326, filed on Sep. 18, 2013.

(51) Int. Cl.
*G06F 17/30* (2006.01)
*G06F 3/0483* (2013.01)
(Continued)

(52) U.S. Cl.
CPC ...... *G06F 17/30029* (2013.01); *G06F 3/0482* (2013.01); *G06F 3/0483* (2013.01);
(Continued)

(58) Field of Classification Search
CPC .............. G06F 3/0484; G06F 3/0488; G06F 17/30905; G06F 17/30023;
(Continued)

(56) References Cited

U.S. PATENT DOCUMENTS

2002/0054123 A1* 5/2002 Walden ................ G06F 9/4446
715/781
2002/0113823 A1* 8/2002 Card ..................... G06F 3/0483
715/776

(Continued)

OTHER PUBLICATIONS

Zazzle; Archive.org date Aug. 24, 2012; retrieved Nov. 17, 2016; retrieved from https://web.archive.org/web/20120824011153/http://www.zazzle.com/.*

(Continued)

*Primary Examiner* — Eric Wiener
(74) *Attorney, Agent, or Firm* — Xin Wen

(57) ABSTRACT

A computer-implemented method is disclosed to assist a user to view image product designs at a graphic user interface. The method includes displaying an image representation in a page view at a graphic user interface, allowing a user to select the image representation in the page view, displaying a navigation panel in association with the image representation in the same page view, allowing the user to make a first selection in the navigation panel in the page view, displaying a first product design in the same page view according to the first selection, allowing the user to make a second selection in the navigation panel in the page view, displaying a second product design in the same page view according to the second selection, and removing the display of the navigation panel in the same page view when the product designs are deselected by the user.

15 Claims, 18 Drawing Sheets

(51) Int. Cl.
*G06F 3/0482* (2013.01)
*G06Q 30/06* (2012.01)
*G06F 3/0484* (2013.01)
*G06F 3/0485* (2013.01)
*H04N 1/00* (2006.01)
*G06F 3/0481* (2013.01)

(52) U.S. Cl.
CPC ........ *G06F 3/0484* (2013.01); *G06F 3/04855* (2013.01); *G06F 17/30047* (2013.01); *G06F 17/30905* (2013.01); *G06Q 30/0621* (2013.01); *G06Q 30/0643* (2013.01); *H04N 1/00442* (2013.01); *H04N 1/00458* (2013.01); *H04N 1/00464* (2013.01); *G06F 3/0481* (2013.01); *G06F 17/30023* (2013.01); *G06F 17/30244* (2013.01); *H04N 1/00424* (2013.01); *H04N 1/00445* (2013.01)

(58) Field of Classification Search
CPC ......... G06F 17/30029; G06F 17/30244; G06F 17/30047; G06F 3/0481; H04N 1/00458; H04N 1/00424; H04N 1/00442; H04N 1/00445; H04N 1/00464
See application file for complete search history.

(56) References Cited

U.S. PATENT DOCUMENTS

| | | | |
|---|---|---|---|
| 2004/0030719 A1* | 2/2004 | Wei | G06F 17/30905 |
| 2007/0162845 A1* | 7/2007 | Cave | G06F 17/218 715/209 |
| 2008/0215615 A1* | 9/2008 | Hoover | G06Q 10/10 |
| 2008/0278437 A1 | 11/2008 | Barrus | |
| 2010/0212526 A1 | 8/2010 | Schulmeister | |
| 2010/0325211 A1* | 12/2010 | Ylinen | G06F 9/4443 709/205 |
| 2011/0087966 A1* | 4/2011 | Leviathan | G06F 17/30905 715/745 |
| 2012/0210200 A1* | 8/2012 | Berger | G06F 3/04845 715/202 |
| 2012/0265758 A1* | 10/2012 | Han | G06F 17/30038 707/737 |

OTHER PUBLICATIONS

Design Your Own iPhone Case; CafePress; Archive.org date Jul. 22, 2012; retrieved Jan. 9, 2017; retrieved from http://web.archive.org/web/20120722052925/http://www.cafepress.com/make/custom-iphone-cases.*

* cited by examiner

GRAPHIC USER INTERFACE FOR A GROUP OF IMAGE PRODUCT DESIGNS

TECHNICAL FIELD

This application relates to utilization of digital images, and more specifically, to a graphic user interface for viewing image product designs.

BACKGROUND OF THE INVENTION

Digital images can be stored in user's computers and viewed on electronic display devices. Users can upload digital images to a central network location provided by image service providers such as Shutterfly, Inc. Such image service providers can enable users to store, organize, manage, edit, enhance, and share digital images at the central network location using a web browser or other software applications. A user can also design and personalize image-based products, and order the image-based products from the image service provider. Examples of the image-based products include image prints, photo books, photo calendars, photo greeting cards, holiday cards, photo stationeries, photo mugs, and photo T-shirts, which incorporate image content provided by the user or the image service provider.

The proliferation of mobile devices such as camera phones and tablet computers enables an increasing number of users to take pictures, share photos, post photos online, and create personalized photo products or projects. Creating personalized image products, however, can take considerable amount of time and effort. Additionally, it is challenging to personalize image products using mobile devices because these devices often have smaller displays, lower communication bandwidth, and possibly have lower computing power comparing to desk computers. Users of mobile devices also tend to have shorter attention span than users of desktop or laptop computers.

There is therefore a need for more convenient tools to view image designs and image products, especially on mobile devices.

SUMMARY OF THE INVENTION

The present application disclosed a novel computer-implemented method for displaying a group of product designs or multiple views of an image product in a single screen (or view page). In another aspect, the present application disclosed a novel computer-implemented method for displaying an image product comprising multiple pages. The disclosed method simplifies the multiple view pages in conventional methods into display objects in a single view page. The disclosed method is intuitive, more convenient to use, and responds faster to user commands. The disclosed method can be beneficial for applications on mobile devices such as smart phones.

In one general aspect, the present invention relates to a computer-implemented method for a user to view image product designs at a graphic user interface. The method includes: displaying an image representation in a page view at a graphic user interface, wherein the image representation represents a group of product designs of a same image product type; allowing a user to select the image representation in the page view; in response to user's selection of the image representation, displaying a navigation panel in association with the image representation in the same page view by a computer system, wherein the navigation panel provides a plurality of selections each associated with one of the product designs; allowing the user to make a first selection in the navigation panel in the page view; displaying a first product design in the same page view according to the first selection; allowing the user to make a second selection in the navigation panel in the page view; displaying a second product design in the same page view according to the second selection; and removing the display of the navigation panel in the same page view when the product designs are deselected by the user.

Implementations of the system may include one or more of the following. The first product design and the second product design both can incorporate at least one common picture and have different product layouts. The common picture can be from the user. The first product design and the second product design can have a same product layout and incorporate different pictures. The different pictures can be from the user. The computer-implemented method can further include displaying a rotation guide in association with the first product design, wherein the first product design comprises a plurality of perspective views; and allowing the user to select one of the perspective views of the first product design using the rotation guide. The computer-implemented method can further include automatically selecting, by the computer system, one or more user pictures to be incorporated into the group of product designs in association with the image representation. The computer-implemented method can further include allowing the user to select one or more user pictures to be incorporated into the group of product designs in association with the image representation. The step of allowing the user to select one or more user pictures can include allowing the user to move the one or more user pictures into the image representation in the graphic user interface. The step of allowing a user to select the image representation can include tapping a touch sensitive display device or moving a cursor over the image representation. The step of allowing the user to make a first selection in the navigation panel can include tapping a touch sensitive display device or moving a cursor over the first selection in the navigation panel. The computer-implemented method can further include displaying a plurality of image representations representing different image products in the page view. The plurality of image products can include a photobook, a photo calendar, a photo greeting card, a multi-panel greeting card, photo stationery, a phone case, a photo mug, an image print, a photo magnet, a photo coaster, or a photo mouse pad. The navigation panel can include a linear array of grids that define the plurality of selections each associated with one of the product designs. The navigation panel can include a two-dimensional array of grids that define the plurality of selections each associated with one of the product designs. The image representation can include a thumbnail image of the product type. The image representation can be a perspective view of the product type. The computer system can include a mobile device. The graphic user interface can be enabled by a web browser, a client application, or a native application. The page view can include a web page in a web browser or a screen on a device.

In another general aspect, the present invention relates to a computer-implemented method for a user to view image product at a graphic user interface. The method includes displaying an image representation of a multi-page product in a page view at a graphic user interface; allowing a user to select the image representation in the page view; in response to user's selection of the image representation, enabling display by a computer system, in the same page view, of a navigation panel in association with the image representation, wherein the navigation panel provides a plurality of selections each associated with one or more pages in the multi-page product; allowing the user to make a first selection in the navigation panel in the page view; displaying first one or more pages of the multi-page product in the same page view according to the first selection; and removing the display of the navigation panel in the same page view when the multi-page product is deselected by the user.

Implementations of the system may include one or more of the following. The computer-implemented method can further include allowing the user to make a second selection in the navigation panel in the page view, and displaying second one or more pages of the multi-page product in the same page view according to the second selection. The step of allowing a user to select the image representation can include tapping a touch sensitive display device by the user. The step of allowing a user to select the image representation can include moving a cursor over the image representation by the user. The computer-implemented method can further include in response to user's selection of the image representation, enabling display, in the same page view, of a page layout in association with the image representation and the navigation panel, wherein the first one or more pages of the multi-page product can be displayed in the page layout. The page layout can be displayed over the image representation. The computer-implemented method can further include displaying the image representation of the multi-page product in the same page view when the multi-page product is deselected by the user. The page layout can be associated with a single page of the multi-page product. The page layout can be associated with two opposing pages of the multi-page product. The one or more pages of the multi-page product can include at least one of a photo or personalized text. The computer-implemented method can further include displaying image representations of a plurality of image products including the multi-page product in the page view. The plurality of image products can include a photobook, a photo calendar, a photo greeting card, a multi-panel greeting card, photo stationery, a phone case, a photo mug, an image print, a photo magnet, a photo coaster, or a photo mouse pad. The navigation panel can include a linear array of grids that define the plurality of selections each associated with one or more pages in the multi-page product. The navigation panel can include a two-dimensional array of grids that define the plurality of selections each associated with one or more pages in the multi-page product. The image representation can include a thumbnail image of the multi-page product. The image representation can include a front cover of the multi-page product. The image representation can be a perspective view of the multi-page product. The computer system can include a mobile device. The graphic user interface can be enabled by a web browser, a client application, or a native application. The page view can include a web page in a web browser or a screen on a device.

These and other aspects, their implementations and other features are described in detail in the drawings, the description and the claims.

DETAILED DESCRIPTION OF THE INVENTION

Figure 1:
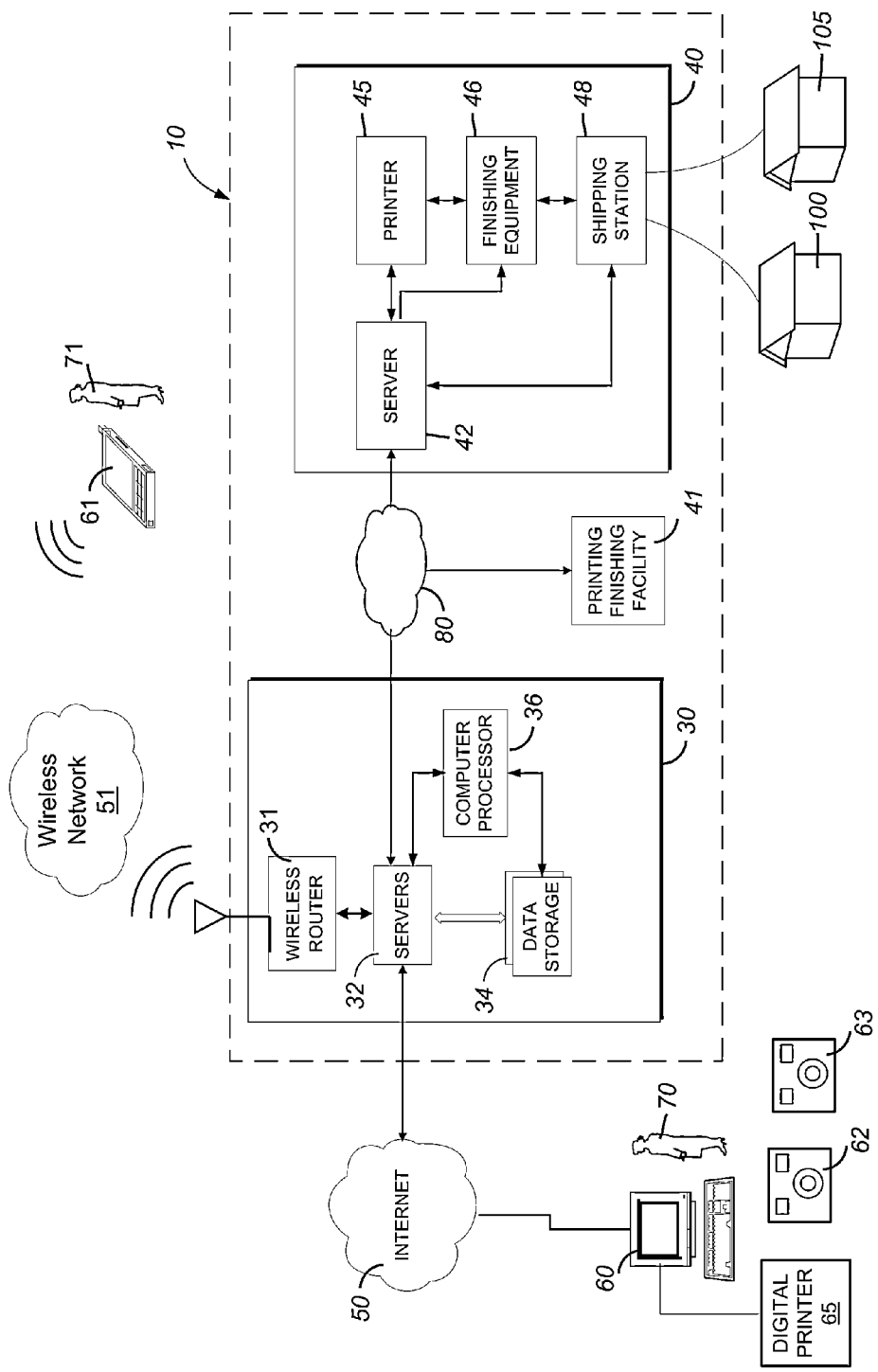
FIG. 1 is a block diagram of a network-based imaging service system compatible with the present invention.

Referring to FIG. 1, an imaging service system 10 can enable users 70, 71 to organize and share images via a wired network or a wireless network 51. Optionally, the imaging service system 10 can also fulfill image products for the users 70, 71. The imaging service system 10 includes a data center 30, one or more product fulfillment centers 40, 41, and a computer network 80 that facilitates the communications between the data center 30 and the product fulfillment centers 40, 41.

The data center 30 can include a server 32 for communicating and receiving input from the users 70, 71, a data storage device 34 for storing user data, image and design data, and a computer processor 36 for rendering images, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51.

The imaging service system 10 allows users to design and personalize their products. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photo books, personalized greeting cards, photo stationery, photo or image prints, photo posters, photo banners, photo playing cards, photo T-shirts, photo mugs, photo aprons, photo magnets, photo mouse pads, a phone case, a case for a tablet computer, photo key-chains, photo collectors, photo coasters, photo banners, or other types of photo gifts or novelty items. Photo book generally refers to as bound multi-page product that includes at least one image on a book page. Photo books can include photo albums, scrapbooks, bound photo calendars, or photo snap books, etc. The image products each can include a single page or multiple pages. Each page can include one or more images, text, and design elements. Some of the images may be laid out in an image collage.

The user 70 or her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include a camera that is integrated with or built-in in the computer device 60. The user 70 can also print pictures using a printer 65 and make image products based on the images from the cameras 62, 63. The cameras 62, 63 can include a digital camera, a camera phone, a video camera capable of taking still images, or an image capture device installed on a laptop computer or a tablet computer. The images from the cameras 62, 63 can be uploaded to the server 32 to allow the user 70 to organize and render images at the website, share the images with others, and design or order image product using the images from the cameras 62, 63 or elsewhere.

Examples for the wireless device 61 include a mobile phone, a tablet computer, or a laptop computer, personal digital assistant, etc. The wireless device 61 can include a built-in camera (e.g. in the case of a camera phone). The images taken by the user 71 using the wireless device 61 can also be uploaded to the data center 30. If users 70, 71 are members of a family or associated in a group (e.g. a soccer team), the images from the cameras 62, 63 and the mobile device 61 can be grouped together to be incorporated into an image product such as a photo book, or used in a blog page for an event such as a soccer game.

Once an image product design is created, a user can order it from the image service provider. The image product design and associated data can be transmitted to the server 42 in the product fulfillment center 40. The image product can be printed by a printer 45, finished by finishing equipment 46, and shipped to locations 100, 105 from shipping station 48. The finished image products can be shipped to the user herself, or as gifts to other recipients.

Although large numbers of photos are frequently captured by various devices, only a small fraction of the digital images are used in customized imaging products. This diversion becomes especially prominent in mobile devices: a vast majority of photos captured by smart camera phones are not used in creative image products or image project designs. Such diversion is caused in part by a lack of tools to assist users to quickly create personalized image product designs in a small display, short user-attention, and often low communication-bandwidth environment.

Figure 2:
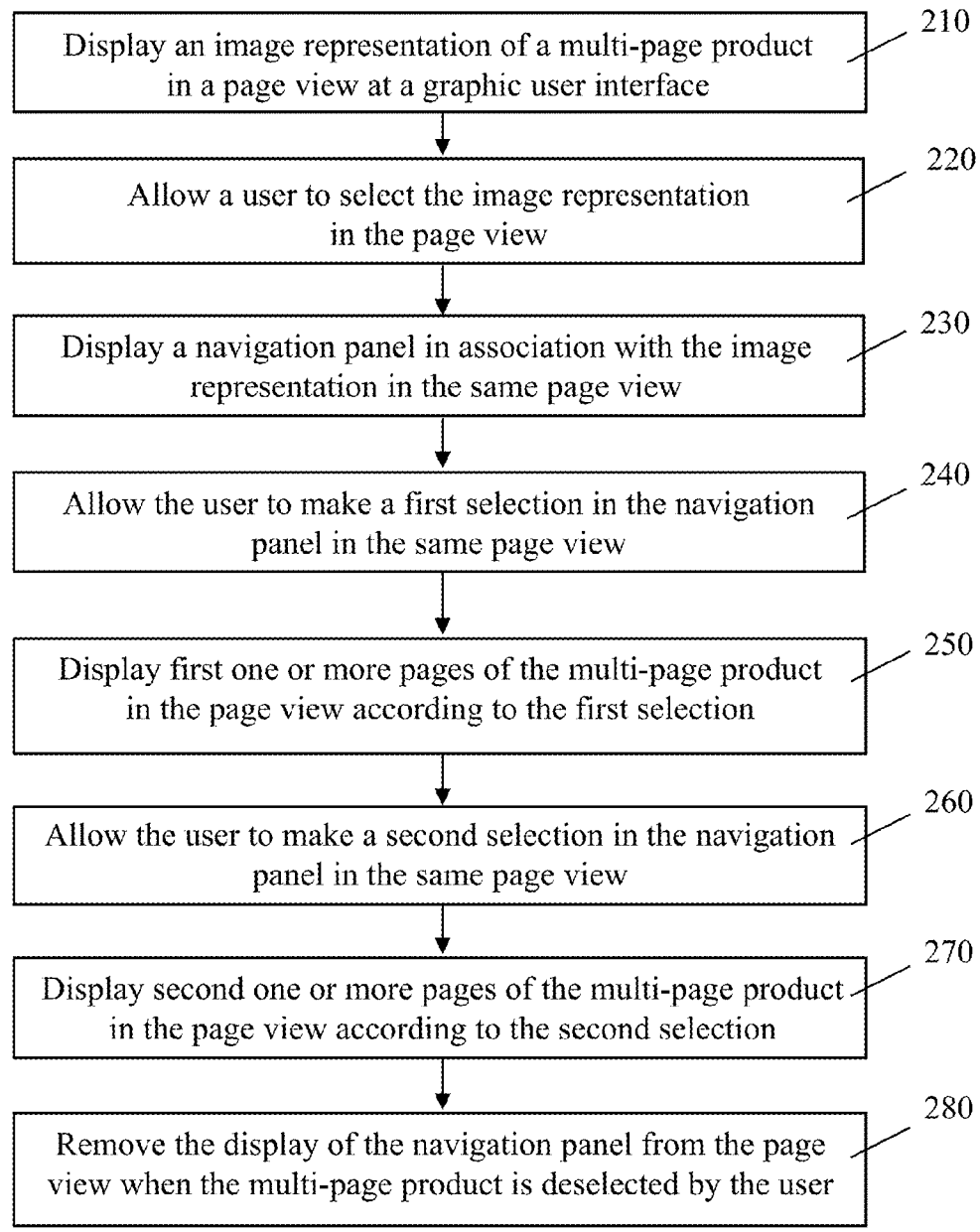
FIG. 2 shows a process to allow a user to view a multi-page image product at a graphic user interface in accordance to the present invention.
Figure 3:
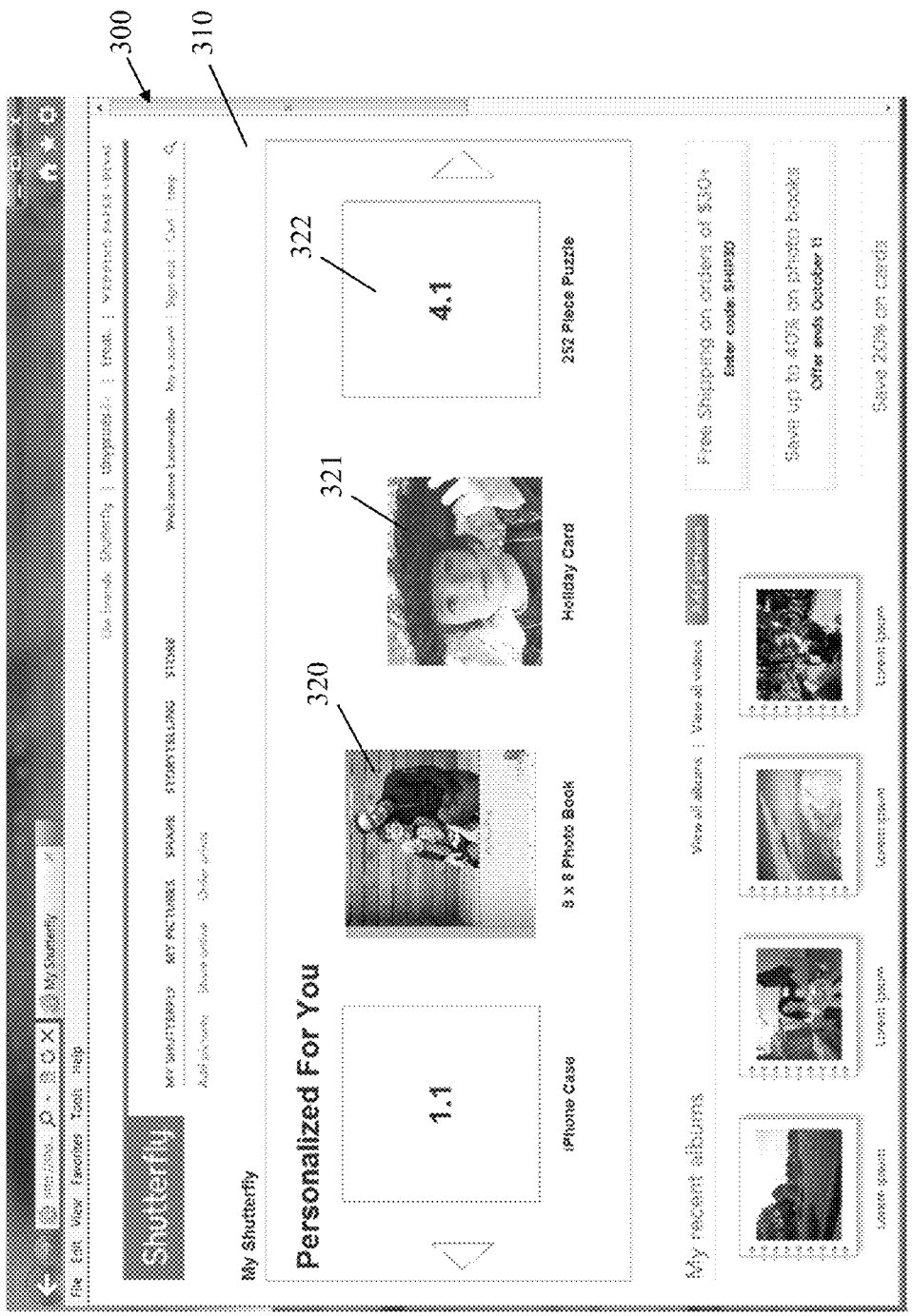
FIG. 3 shows a page view at a graphic user interface including an image representation of a multi-page image product.

Referring to FIGS. 2 and 3, a page view 310 is displayed at a graphic user interface 300. The page view 310 includes the display of an image representation 320 that represents a multi-page product (step 210). The page view 310 can also display other image products such as a holiday card 321, a puzzle 322. Other image products that can be displayed include a photo greeting card, a photo calendar, photo stationery, a phone case, a photo mug, a photo T-shirt, a photo apron, an image print, a photo magnet, a photo coaster, a photo mouse pad, a key chain, a photo collector, or other types of photo gifts or novelty items. The graphic user interface 300 can be displayed at a computer device (e.g. 60 in FIG. 1), a wireless device (e.g. 61 in FIG. 1), and other types computing or communication devices. For example, the graphic user interface 300 can be provided by a web browser, a client application, or a native application such as mobile application for mobile phones, tablet computers, etc. The term "a page view" refers to a single page or a single screen at a graphic user interface. For example, a page view can refer to a web page in a web browser, or a screen enabled by a native application on a mobile device.

Examples of multi-page image product include a photobook, a photo calendar, a multi-panel photo greeting card, etc. For example, the multi-page image product is exemplified by an 8×8 Photo Book in FIG. 3. The image representation 320 for the multi-page product can be a thumbnail image such an image of the front cover of the multi-page product. The image representation 320 can be a two-dimensional view and a three-dimensional perspective view of the multi-page product.

A user can request to see the multi-page product by selecting the image representation 320 in the page view 310 (step 220). The selection can be made by moving a cursor over the image representation 320, which can be accomplished using a mouse (i.e. a command that is sometimes called "mouse over"), a touch pad, a stylus, or eye tracking (e.g. gaze tracking), etc. For example, a cursor can be moved by one of the above methods over the image representation 320 to indicate the selection. On a touch sensitive display, the selection can also be done by user's hand tapping the image representation 320 on the display device.

Figure 4:
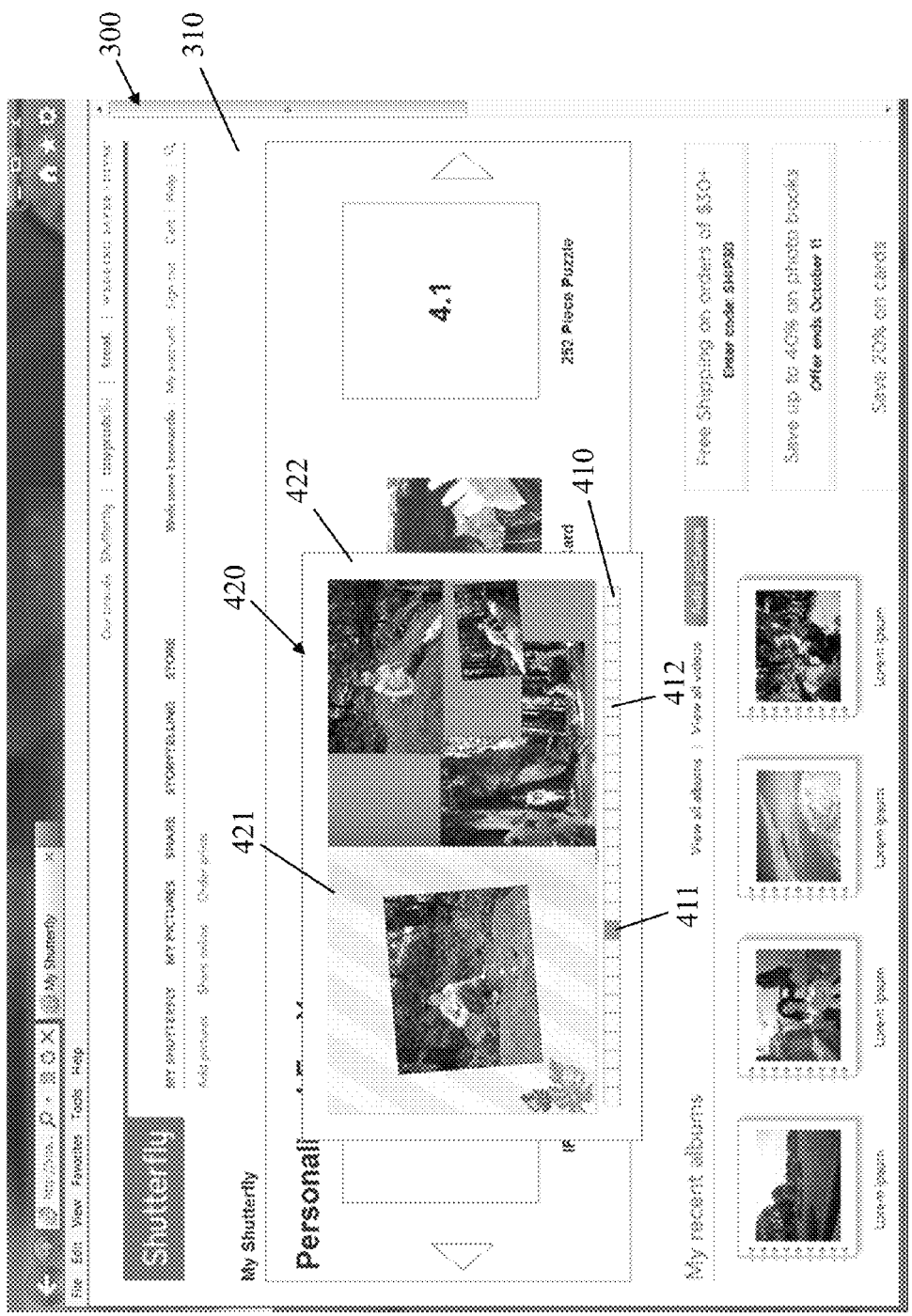
FIG. 4 is shows a navigation panel and displaying of one or more pages of the multi-page image product based on a selection in the navigation panel in the same page view at the graphic user interface.

In response to the selection of the multi-page product by the user, referring to FIGS. 2 and 4, a navigation panel 410 and a book page layout 420 dynamically appear in the same page view 310 in association with the image representation (step 230). The navigation panel 410 can be implemented in a linear array (i.e. a navigation bar) as shown in FIG. 4, or in a two-dimensional array. The navigation panel 410 can include a grid of a plurality of selections each corresponding to one or more pages. The user can select one grid 411 in the navigation panel 410 by mouse over and tapping the grid 411 in the same page view 310 (step 240). The one or more product pages 421, 422 are displayed according to the selection of the grid 411 in the book page layout 420 (step 250). The product pages 421, 422 can include one or more photos and personalized text provided by the user.

The book page layout 420 can hold two opposing pages, as shown, or a single page of the multi-page product (e.g. a photobook). In some implementations, as shown in FIG. 4, the navigation panel 410 and the book page layout 420 are displayed over the image representation 320 (FIG. 3) in the page view 310, which not only visually relates the navigation panel 410 and the book page layout 420 to the multipage image product but also saves space for the continued displaying of other objects in the graphic user interface 300.

Figure 5:
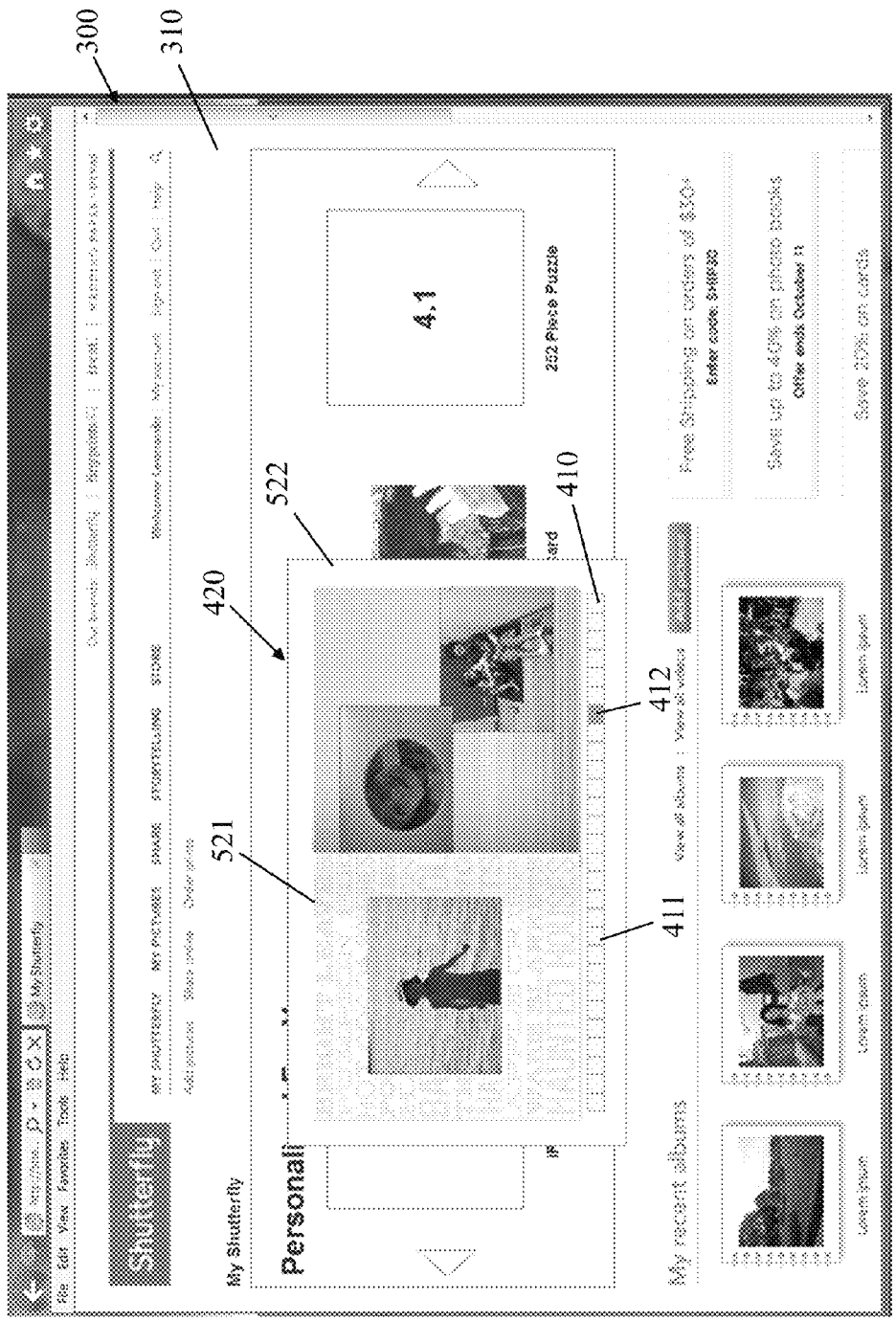
FIG. 5 is shows a navigation panel and displaying of one or more different pages of the multi-page image product based on a different selection in the navigation panel in the same page view at the graphic user interface.

Referring to FIGS. 2 and 5, the user can select a different grid 412 in the navigation panel 410 (step 260). Different product pages 521, 522 are displayed according to the selection of the grid 412 in the book page layout 420 (step 270). The product pages 421, 422 can be refreshed by the product pages 521, 522, or alternatively, the pages turn continuously from the product pages 421, 422 to the product pages 521, 522.

The user can deselect the multi-page product by moving the cursor or touch outside the book page layout 420. Once it is deselected, the navigation panel 410 and the book page layout 420 are removed from the page view 310; the image representation 320 of the multi-page product is again displayed in the same page view 310 (step 280), as shown in FIG. 3.

It should be noted that the navigation panel in the disclosed method differs from the scroll bar for book reading in that the disclosed navigation panel appears in the same view page at user's command—only when the user wants to see details of a multi-page image product. When one multi-page image product is not viewed, the navigation panel disappears to allow other products (e.g. holiday card 321, puzzle 322, etc. shown in FIG. 3) to be viewed in detail.

In some embodiments, the image representation 320 (FIG. 3) can represent an image product having different perspective views. The navigation panel 410 (FIG. 4) can be used by a user to select different perspective views of the image product.

In some embodiments, the image representation 320 (FIG. 3) can represent a group of image product designs. The navigation panel 410 (FIG. 4) can be used by a user to select different image product designs. The group of image products can include a product with the same design but having different pictures. For example, a group of greeting card designs can be based on the same card layout but incorporating different images from the user. The images can be stored in the data storage device 34 in the data center 30 (FIG. 1). Similarly, a group of greeting card designs can be based on different card layouts but incorporating a same image from the user.

An advantage of the presently disclosed method is that it allows a user to view details, without leaving a page (a screen), of a multi-page image product, or multiple views of an image product, or multiple designs of an image product incorporating at least one common user picture, or a same product design incorporating different user pictures. It is known that users can be lost or decide to abort session when they have to switch among multiple pages to view different products. The disclosed method of product viewing thus becomes less confusing and time consuming for the users. There can be several image products presented in the same page, each of which can be viewed in detail in the same page.

In some embodiments, referring to FIGS. 6, 7A-7C, a page view 710 is displayed at a graphic user interface 700. The page view 710 includes image representations 720-723 that respectively represent different image products (step 610) each of which is configured to incorporate one or more pictures. Examples of the image products include a photo mug, an iPhone case, a desktop plaque, or a thank you card, a photo greeting card, a photo calendar, photo stationery, a phone case, a photo T-shirt, a photo apron, an image print, a photo magnet, a photo coaster, a photo mouse pad, a key chain, a photo collector, or other types of photo gifts or novelty items. The image representations 720-723 can be two-dimensional views and three-dimensional perspective views of the image products.

The graphic user interface 700 can be displayed at a computer device (e.g. 60 in FIG. 1), a wireless device (e.g. 61 in FIG. 1), and other types computing or communication devices. For example, the graphic user interface 700 can be provided by a web browser, a client application, or a native application such as mobile application for mobile phones, tablet computers, etc. The term "a page view" refers to a single page or a single screen at a graphic user interface. For example, a page view can refer to a web page in a web browser, or a screen enabled by a native application on a mobile device.

At least one of image representations 720-723 (e.g. the image representation 722) represents a group of product designs of a same image product type. The different product designs have the same product layout but incorporate different pictures from the user. For example, the user pictures are selected for the image product associated with the image representation 722 (step 620). The user pictures can be stored in the data storage device 34 in the data center 30 (FIG. 1), on local devices (60, 61 in FIG. 1). In some embodiments, the computer device or the wireless device allows a user to select the two or more user pictures to associate with the image representation 722. For example, a user can drag some user pictures from an image album 715 in the page view 710, and drop into the image representation 722, which associates the dragged user pictures with the image representation 722 and the associated image product. In some embodiments, the computer device or the wireless device is configured to automatically select user pictures that are suitable for the product design of the image representation 722. The selection of the user pictures can be based on the colors, shapes, objects, tone densities, occasions of the user pictures and the product design of the image representation 722. The selection of the user pictures can also be based on the faces and the people identified in the user pictures, the format (e.g. square, portrait, landscape etc.) of the user pictures.

A user can request to see details of the product designs associated with the image representation 722 in the page view 710 (step 630). The selection can be made by moving a cursor over the image representation 722, which can be accomplished using a mouse (i.e. a command that is sometimes called "mouse over"), a touch pad, a stylus, or eye tracking (e.g. gaze tracking), etc. For example, a cursor can be moved by one of the above methods over the image representation 722 to indicate the selection. On a touch sensitive display, the user can select by tapping the image representation 722 on the display device.

Figure 6:
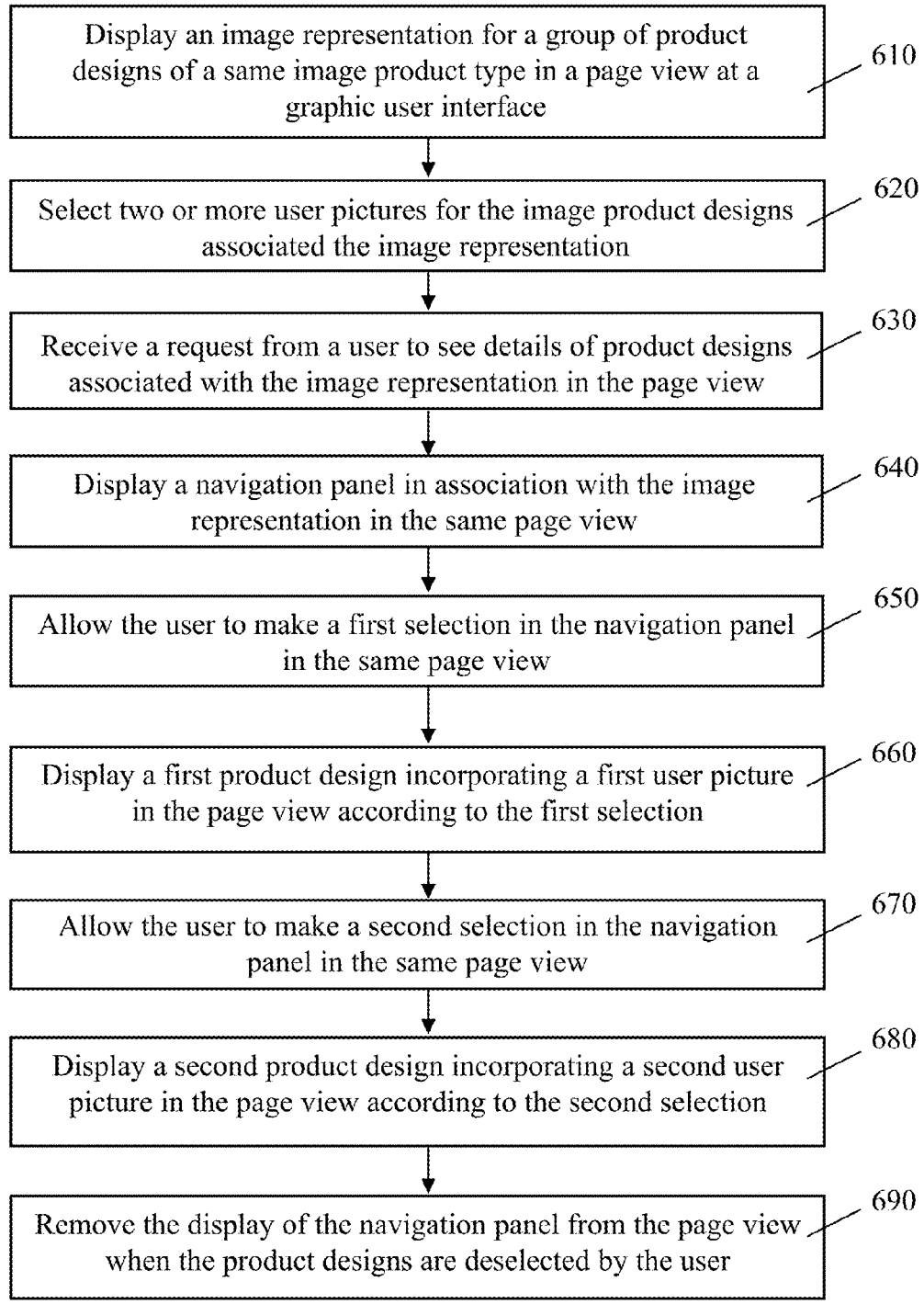
FIG. 6 shows a process that allows a user to view a group of image products having different designs and incorporating a same user picture in a single page view at a graphic user interface in accordance to the present invention.
Figure 7A:
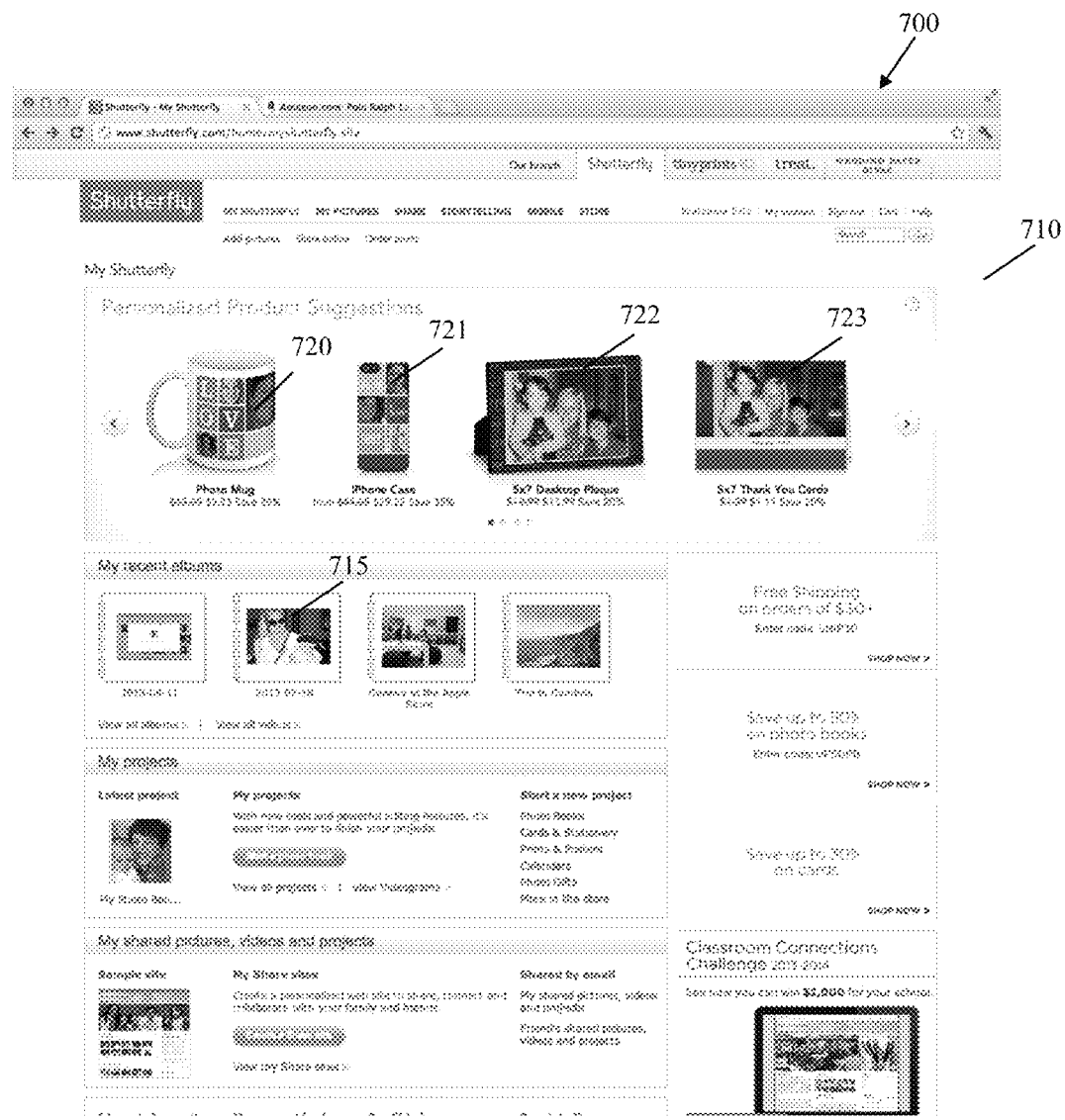
FIGS. 7A-7C show views at a graphic user interface illustrating the process shown in FIG. 6.
Figure 7B:

In response to the selection of the image representation 722 by the user, referring to FIGS. 6 and 7B, a navigation panel 730 and a large product design 741 dynamically appear in the same page view 710 in association with the image representation 722 (step 640). Optionally, other image representations 720, 721, 723 can be reduced in sizes in the page view 710. The navigation panel 730 can be implemented in a linear array (i.e. a navigation bar) or in a two-dimensional array. The navigation panel 730 can include a grid representing a plurality of selections each corresponding to different user pictures for the same product layout. The user can select one grid 731 in the navigation panel 730 by mouse over and tapping the grid 731 in the same page view 710 (step 650). The large product design 741 having a user picture 751 is displayed according to the selection of the grid 731 (step 660).

Figure 7C:
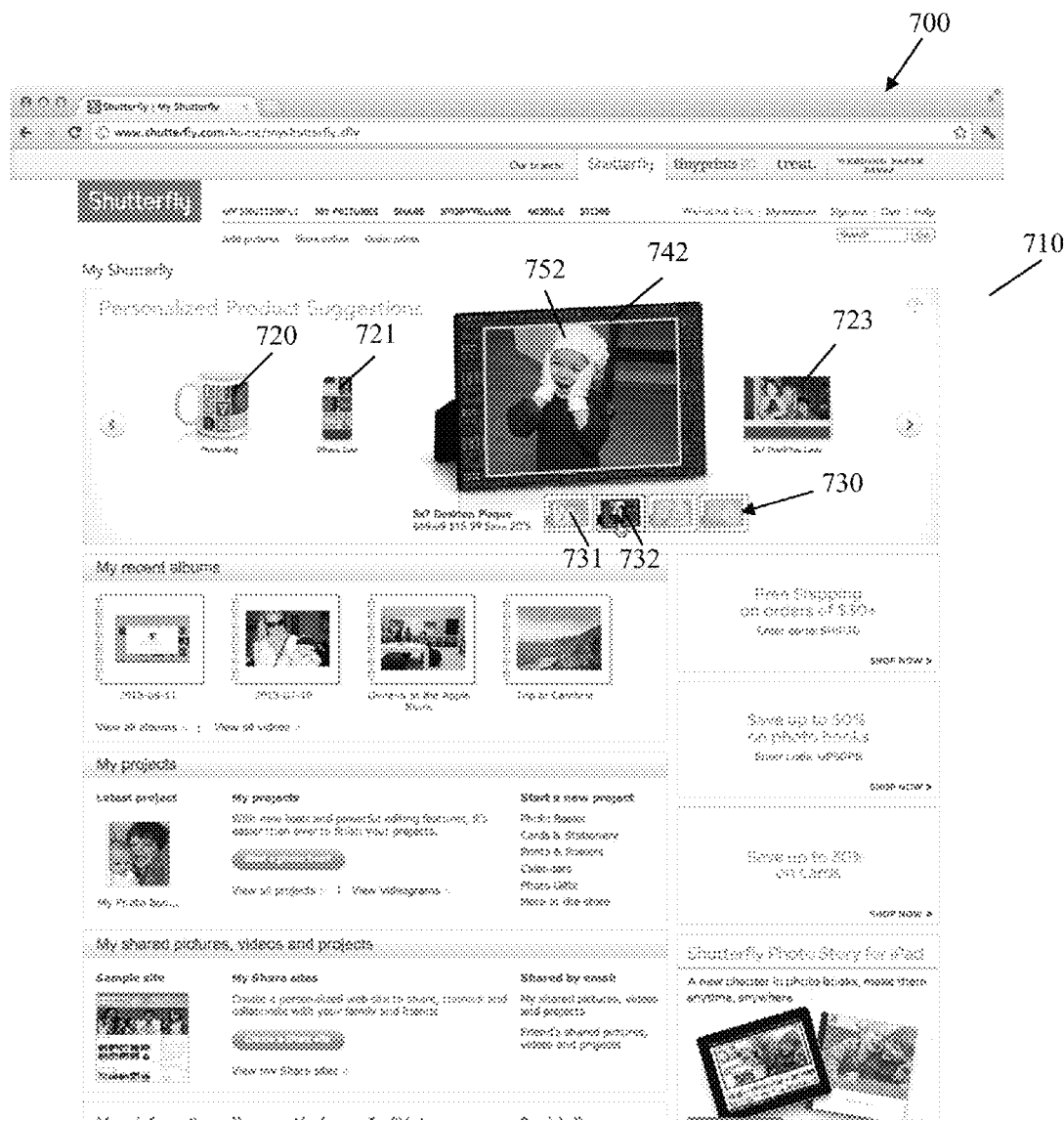

Referring to FIGS. 6 and 7C, the user can select a different grid 732 in the navigation panel 730 (step 670). A large product design 742 having a different user picture 752 is displayed according to the selection of the grid 732 (step 680).

The user can deselect product designs associated with the image representation 722 by moving the cursor or touch outside the large product design 741, 742 or deselecting the navigation panel 930. Once it is deselected, the navigation panel 730 is removed from the page view 710. The image representation 722 is again displayed in the same page view 710 (step 690), as shown in FIG. 7A.

In some embodiments, referring to FIGS. 8, 9A-9C, a page view 910 is displayed at a graphic user interface 900. The page view 910 includes image representations 920-923 that respectively represent different image products (step 810) each of which is configured to incorporate one or more pictures. Examples of the image products include a photo mug, an iPhone case, a desktop plaque, or a thank you card, a photo greeting card, a photo calendar, photo stationery, a phone case, a photo T-shirt, a photo apron, an image print, a photo magnet, a photo coaster, a photo mouse pad, a key chain, a photo collector, or other types of photo gifts or novelty items. The image representations 920-923 can be two-dimensional views and three-dimensional perspective views of the image products.

The graphic user interface 900 can be displayed at a computer device (e.g. 60 in FIG. 1), a wireless device (e.g. 61 in FIG. 1), and other types computing or communication devices. For example, the graphic user interface 900 can be provided by a web browser, a client application, or a native application such as mobile application for mobile phones, tablet computers, etc. The term "a page view" refers to a single page or a single screen at a graphic user interface. For example, a page view can refer to a web page in a web browser, or a screen enabled by a native application on a mobile device.

At least one of image representations 920-923 (e.g. the image representation 922) represents a group of product designs of a same image product type. The different product designs have different product layouts but incorporate at least some common user pictures. Optionally, one or more user pictures can be selected for the product designs associated with the image representation 922 (step 820). The one or more user pictures can be stored in the data storage device 34 in the data center 30 (FIG. 1), on local devices (60, 61 in FIG. 1). In some embodiments, the computer device or the wireless device allows a user to select the two or more user pictures to associate with the image representation 922. For example, a user can drag one or more user pictures from an image album 915 in the page view 910, and drop into the image representation 922, which associates the dragged user pictures with the image representation 922 and the associated image product. In some embodiments, the computer device or the wireless device is configured to automatically select one or more user pictures that are suitable for the product design of the image representation 922. The selection of the one or more user pictures can be based on the colors, shapes, objects, tone densities, occasions of the one or more user pictures and the product design of the image representation 922. The selection of the one or more user pictures can also be based on the faces and the people identified in the user pictures, the format (e.g. square, portrait, landscape etc.) of the user pictures.

A user can request to see details of product designs associated with the image representation 922 in the page view 910 (step 830). The selection can be made by moving a cursor over the image representation 922, which can be accomplished using a mouse (i.e. a command that is sometimes called "mouse over"), a touch pad, a stylus, or eye tracking (e.g. gaze tracking), etc. For example, a cursor can be moved by one of the above methods over the image representation 922 to indicate the selection. On a touch sensitive display, the user can select by tapping the image representation 922 on the display device.

Figure 8:
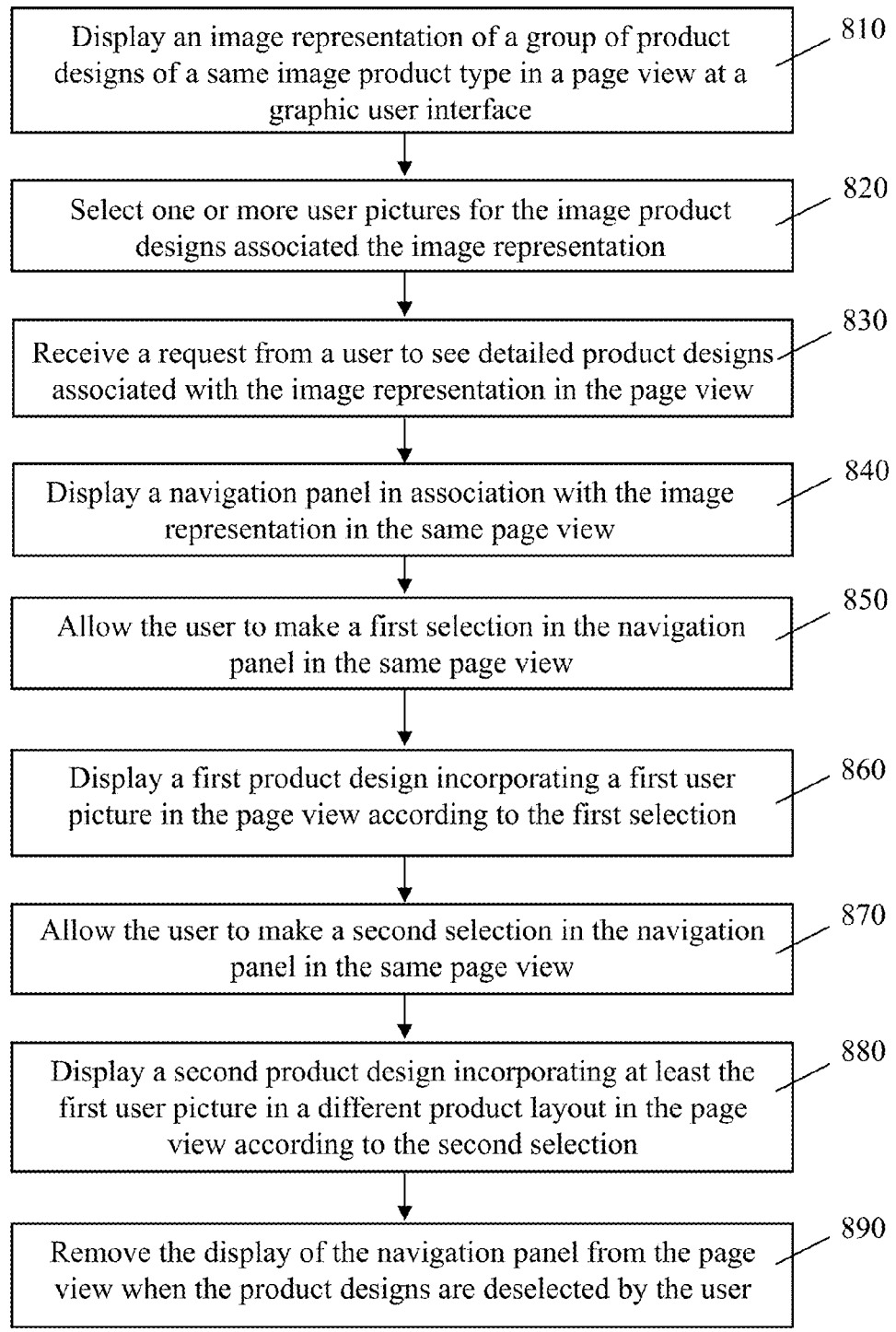
FIG. 8 shows a process to allow a user to view a group of product designs using at least one common user picture in a single page view at a graphic user interface in accordance to the present invention.
Figure 9A:
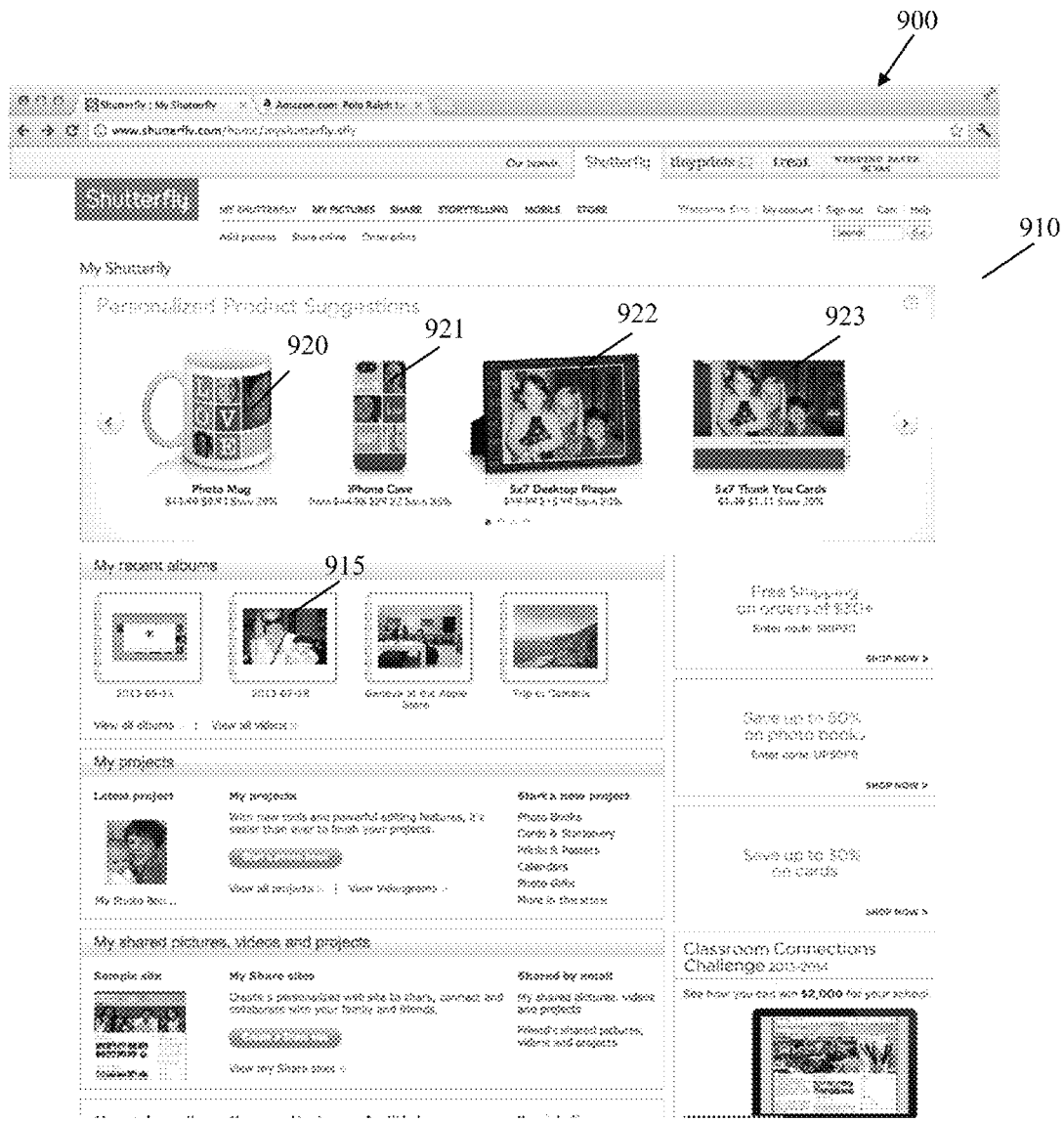
FIGS. 9A-9C show views at a graphic user interface illustrating the process shown in FIG. 8.
Figure 9B:

In response to the selection of the image representation 922 by the user, referring to FIGS. 8 and 9B, a navigation panel 930 and a large product design 941 dynamically appear in the same page view 910 in association with the image representation 922 (step 840). Optionally, other image representations 920, 921, 923 can be reduced in sizes in the page view 910. The navigation panel 930 can be implemented in a linear array (i.e. a navigation bar) or in a two-dimensional array. The navigation panel 930 can include a grid representing a plurality of selections each corresponding to a product different layout. The user can select one grid 931 in the navigation panel 930 by mouse over and tapping the grid 931 in the same page view 910 (step 850). The large product design 941 having a user picture 951 is displayed according to the selection of the grid 931 (step 860).

Figure 9C:
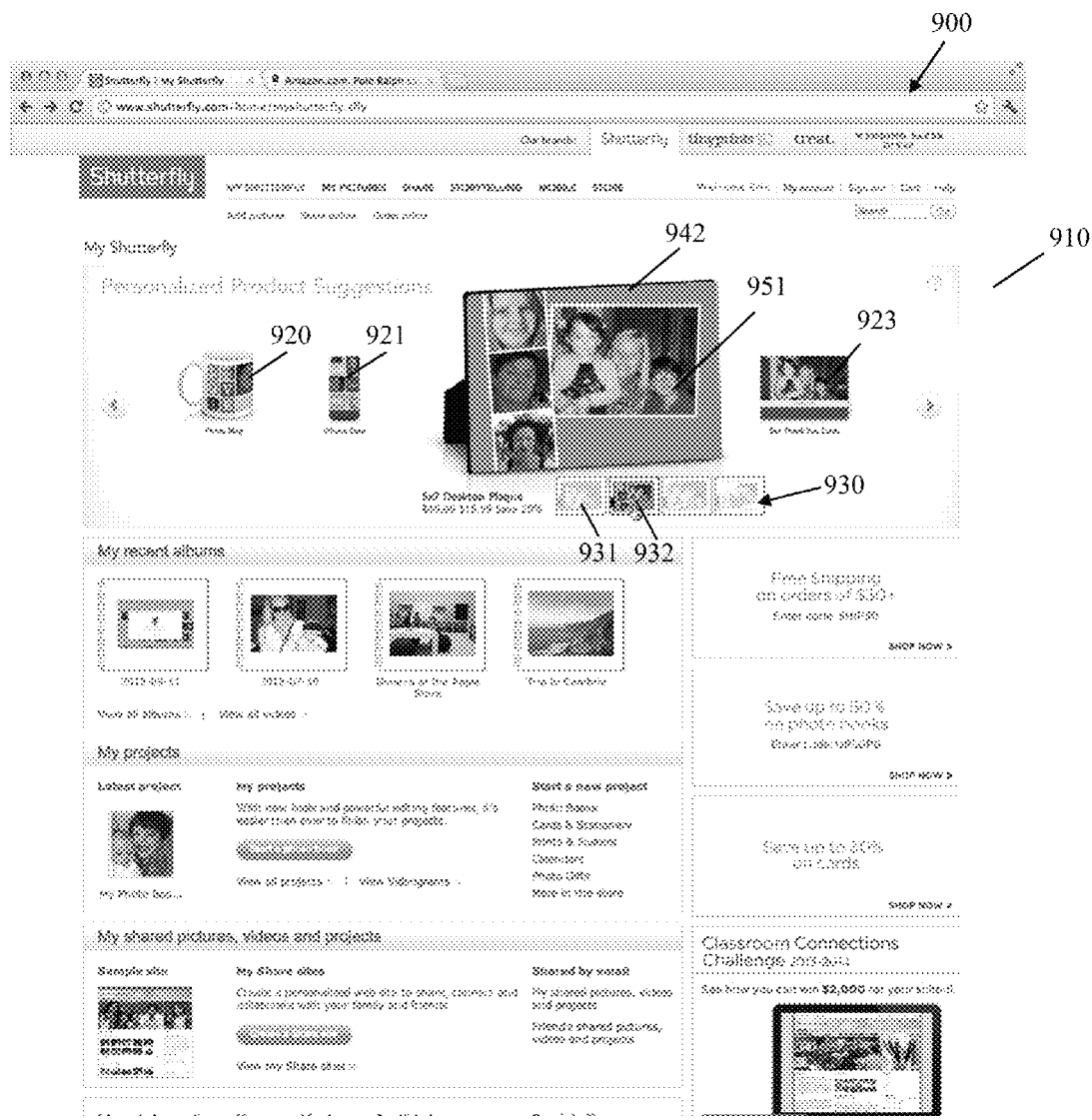

Referring to FIGS. 8 and 9C, the user can select a different grid 932 in the navigation panel 930 (step 870). A large product design 942 having a different product layout and at least one common user picture 952 is displayed according to the selection of the grid 932 (step 880). As shown, since the product design 942 incorporates several user pictures, additional user pictures are added in addition to the common user picture 951.

The user can deselect product designs associated with the image representation 922 by moving the cursor or touch outside the product design 941 or 942 or deselecting the navigation panel 930. Once it is deselected, the navigation panel 930 is removed from the page view 910. The image representation 922 is again displayed in the same page view 910 (step 890), as shown in FIG. 9A.

In some embodiments, referring to FIGS. 10, 11A-11C, a page view 1110 is displayed at a graphic user interface 1100. The page view 1110 includes image representations 1120-1123 that respectively represent different image products (step 1010) each of which is configured to incorporate one or more pictures. Examples of the image products include a photo mug, an iPhone case, a desktop plaque, or a thank you card, a photo greeting card, a photo calendar, photo stationery, a phone case, a photo T-shirt, a photo apron, an image print, a photo magnet, a photo coaster, a photo mouse pad, a key chain, a photo collector, or other types of photo gifts or novelty items. The image representations 1120-1123 can be two-dimensional views and three-dimensional perspective views of the image products.

The graphic user interface 1100 can be displayed at a computer device (e.g. 60 in FIG. 1), a wireless device (e.g. 61 in FIG. 1), and other types computing or communication devices. For example, the graphic user interface 1100 can be provided by a web browser, a client application, or a native application such as mobile application for mobile phones, tablet computers, etc. The term "a page view" refers to a single page or a single screen at a graphic user interface. For example, a page view can refer to a web page in a web browser, or a screen enabled by a native application on a mobile device.

At least one of image representations 1120-1123 (e.g. the image representation 1120) represents one or more product designs of a same image product type (e.g. a photo mug) (step 1010). The different product designs can have different product layouts or incorporate different user pictures. For example, one or more user pictures are selected for the image product associated with the image representation 1120 (step 1020). The one or more user pictures can be stored in the data storage device 34 in the data center 30 (FIG. 1), on local devices (60, 61 in FIG. 1). In some embodiments, the computer device or the wireless device allows a user to select the two or more user pictures to associate with the image representation 1120. For example, a photo mug can incorporate one or more user pictures. For example, a user can drag one or more user pictures from an image album 1115 in the page view 1110, and drop into the image representation 1120, which associates the dragged user pictures with the image representation 1120 and the associated image product. In some embodiments, the computer device or the wireless device is configured to automatically select one or more user pictures that are suitable for the product design of the image representation 1120. The selection of the one or more user pictures can be based on the colors, shapes, objects, tone densities, occasions of the one or more user pictures and the product design of the image representation 1120. The selection of the one or more user pictures can also be based on the faces and the people identified in the user pictures, the format (e.g. square, portrait, landscape etc.) of the user pictures.

A user can request to see details of the product designs associated with the image representation 1120 in the page view 1110 (step 1030). The selection can be made by moving a cursor over the image representation 1120, which can be accomplished using a mouse (i.e. a command that is sometimes called "mouse over"), a touch pad, a stylus, or eye tracking (e.g. gaze tracking), etc. For example, a cursor can be moved by one of the above methods over the image representation 1120 to indicate the selection. On a touch sensitive display, the user can select by tapping the image representation 1120 on the display device.

Figure 10:
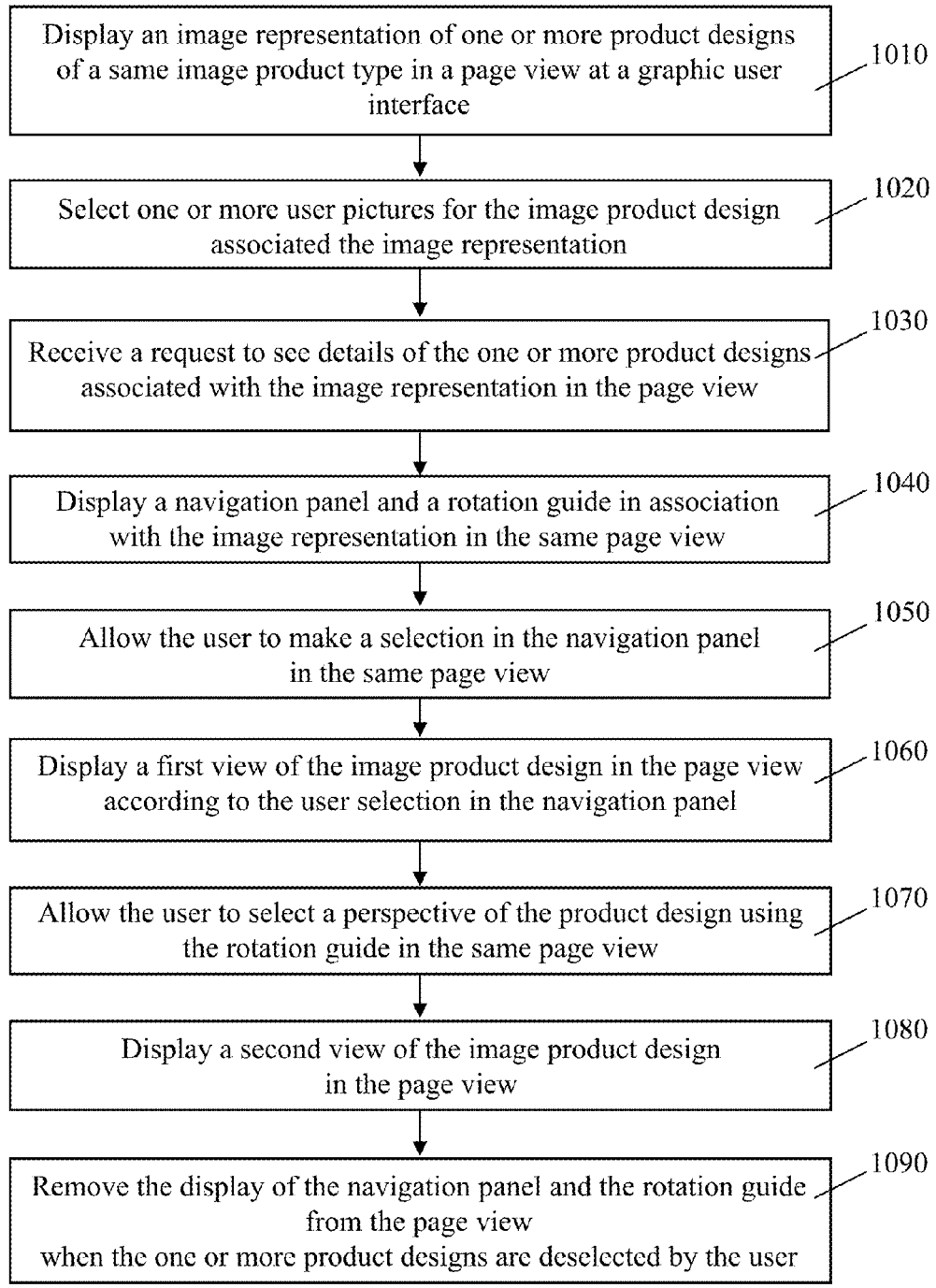
FIG. 10 shows a process to allow a user to view different views of an image product design in a single page view at a graphic user interface in accordance to the present invention.
Figure 11A:
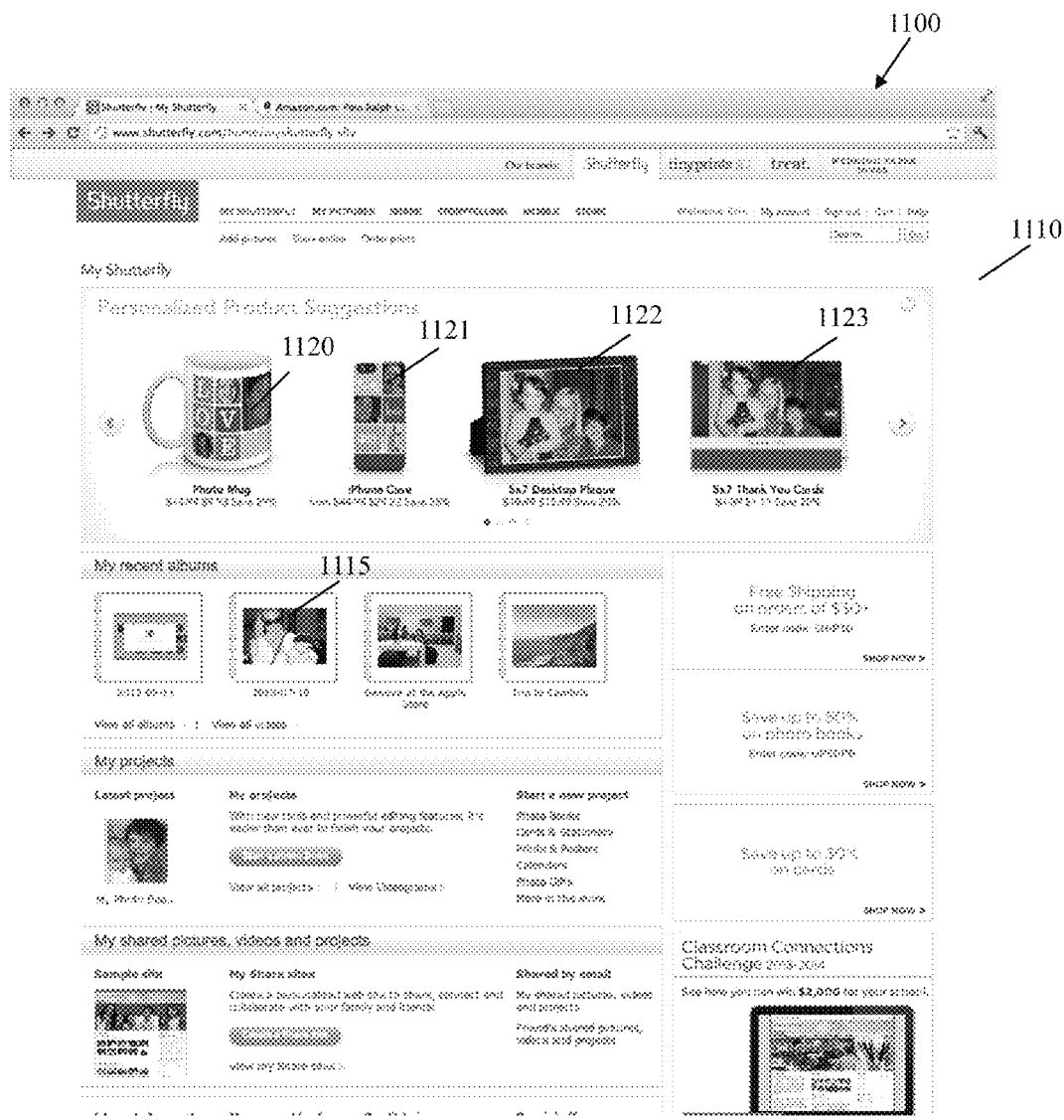
FIGS. 11A-11D show views at a graphic user interface illustrating the process shown in FIG. 10.
Figure 11B:
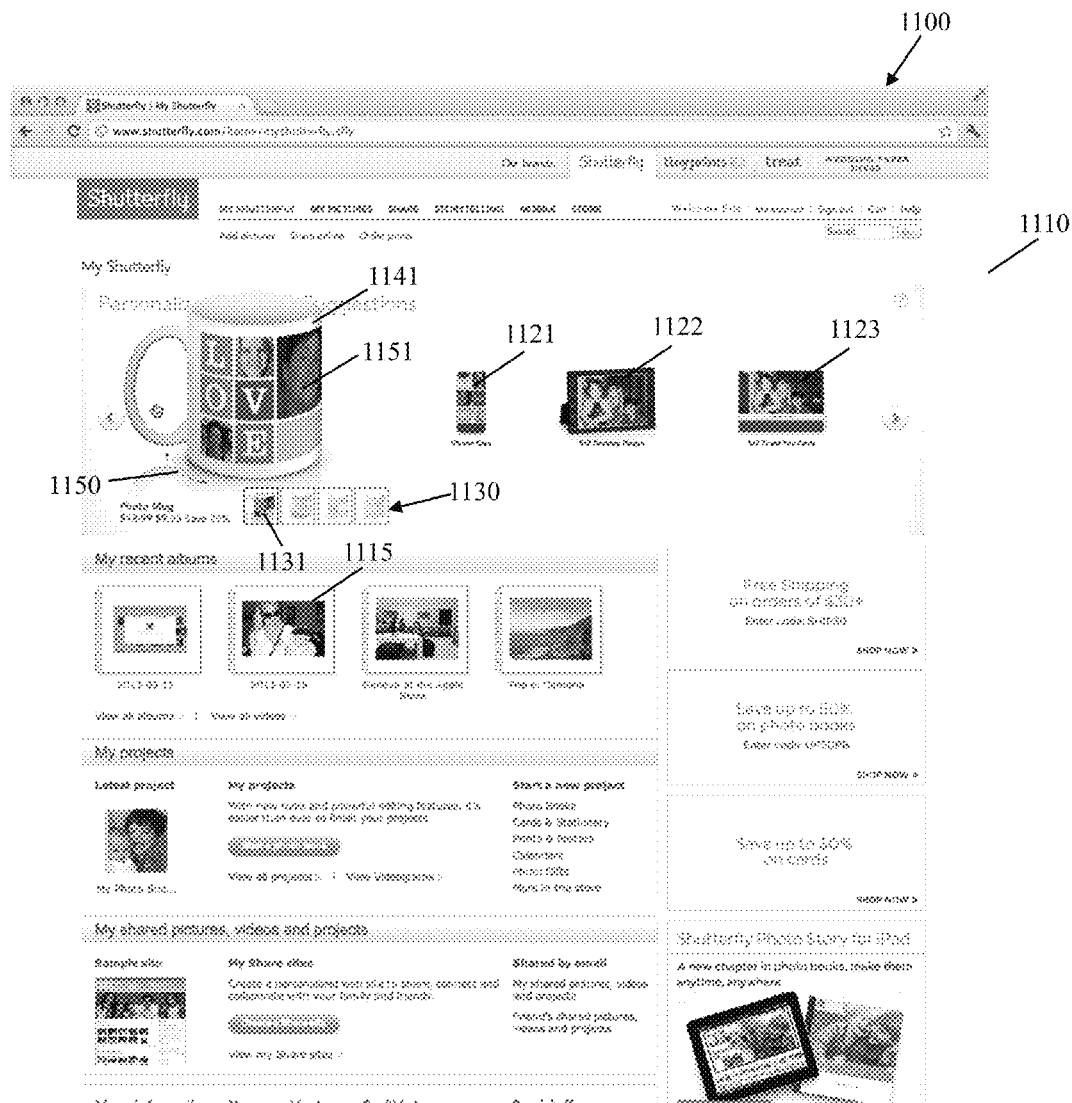

In response to the selection of the image representation 1120 by the user, referring to FIGS. 10 and 11B, a navigation panel 1130, a large product design 1141, and a rotation guide (or rotation tip) 1150 dynamically appear in the same page view 1110 in association with the image representation 1120 (step 1040). Optionally, other image representations 1120, 1121, 1123 can be reduced in sizes in the page view 1110. The navigation panel 1130 can be implemented in a linear array (i.e. a navigation bar) or in a two-dimensional array. The navigation panel 1130 can include a grid representing a plurality of selections each corresponding to a different product layout or a different user picture, similar to those shown in FIGS. 7B-7C and FIGS. 9B-9C. The user can select a grid 1131 in the navigation panel 1130 by mouse over and tapping the grid 1131 in the same page view 1110 (step 1050). The large product design 1141 having a user picture 1151 and a product layout is displayed according to the selection of the grid 1131 (step 1060).

Figure 11C:
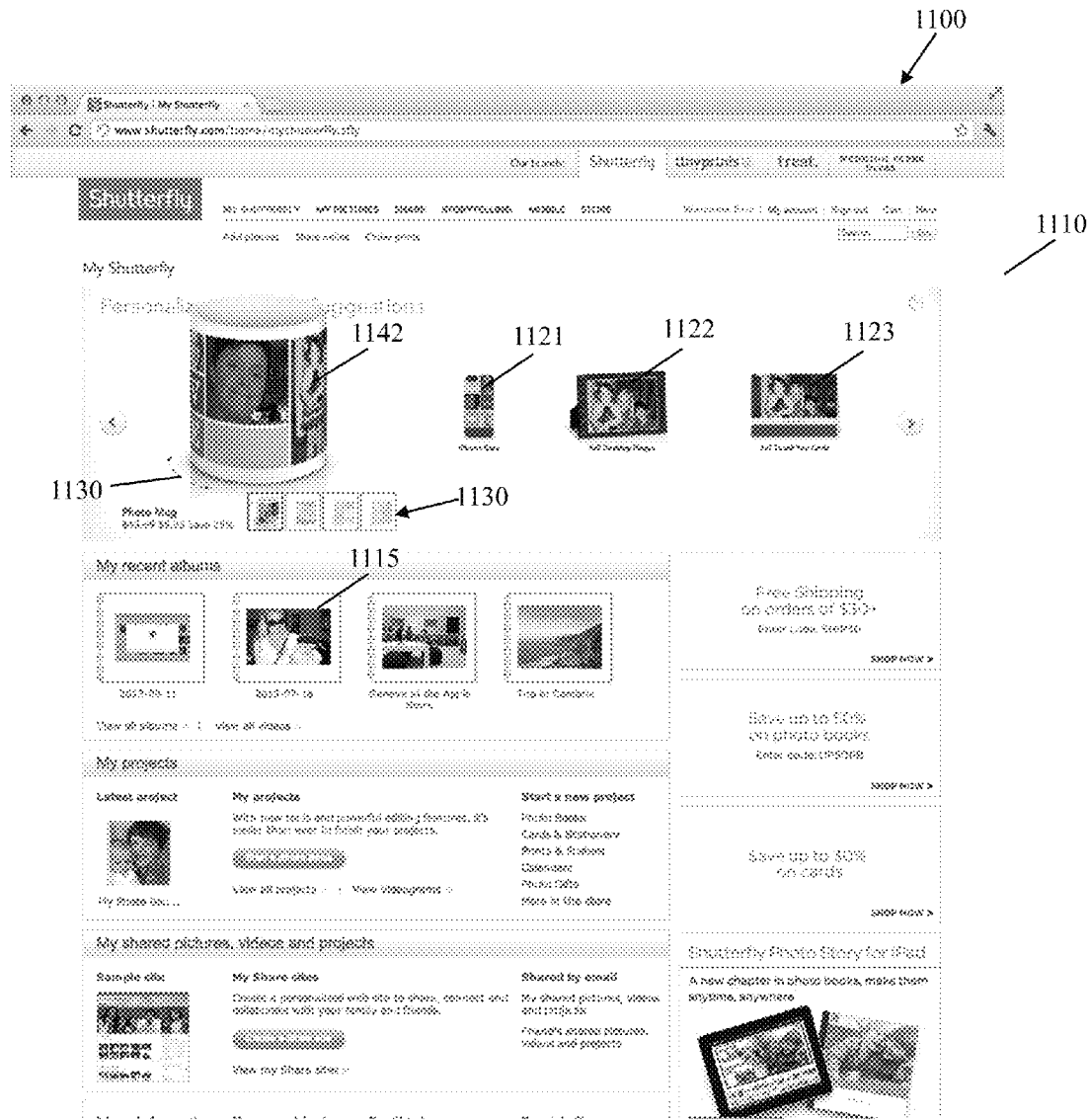
Figure 11D:

Referring to FIGS. 10, 11C, 11D, the user can select a different perspective of the product design using the rotation guide 1150 (step 1070). The user can control a cursor or by touch to rotate the product design (e.g. photo mug) along the direction as indicated by the rotation guide 1150. For example, the photo mug (of a same product design, which has the same product layout and user pictures) can be rotated to different angular positions by moving the cursor to different sides of a photo mug. Large product designs 1142, 1143 at different perspectives are displayed according to the selection of the grid 1132 (step 1080). The user pictures and product layout stay the same for the same selection in the navigation panel 1130.

The user can deselect product designs associated with the image representation 1120 by moving the cursor or touch outside the product designs 1141-1143. Once it is deselected, the navigation panel 1130, the large product designs 1141-1143, and the rotation guide 1150 are removed from the page view 1110. The image representation 1120 is again displayed in the same page view 1110 (step 1090), as shown in FIG. 11A.

It should be understood that the presently disclosed systems and methods can be compatible with different devices, different image products, different user interfaces, or different software formats other than the examples described above. The rotation guide for different perspectives of a product design can be presented in different forms the example described above.

What is claimed is:

1. A computer-implemented method for a user to view image product designs at a graphic user interface, comprising:

displaying multiple of image representations in a page view at a graphic user interface by a computer system, wherein the multiple image representations are associated with different image product types;

receiving a user's selection of one of the multiple image representations in the page view;

in response to user's selection of the one of the image representations, displaying a navigation panel in association with the one of the image representations in the same page view by the computer system, wherein the navigation panel includes a plurality of selections of the product designs for an image product type associated with the one of the image representations, wherein the navigation panel is not in the same page view before the user's selection of the image representation;

receiving a first selection in the navigation panel in the page view;

displaying a first product design in the same page view according to the first selection in place of the one of the image representations;

receiving a second selection in the navigation panel in the page view;

displaying a second product design in the same page view according to the second selection in place of the one of the image representations;

removing the navigation panel from the same page view when the product designs are deselected by the user;

displaying one or more of the multiple of image representations other than the user selected one of the multiple image representations in the page view while the navigation panel in association with the one of the image representations is displayed in the same page view;

receiving a user's selection of another one of the multiple image representations in the page view;

in response to the user's selection of the another one of the image representations, displaying another navigation panel in association with the another one of the image representations in the same page view by the computer system, wherein the another navigation panel includes a plurality of selections of the product designs for an image product type associated with the another one of the image representations;

wherein the multiple image products include a photobook, a photo calendar, a photo greeting card, a multi-panel greeting card, photo stationery, a phone case, a photo mug, an image print, a photo magnet, a photo coaster, or a photo mouse pad.

2. The computer-implemented method of claim 1, further comprising:

displaying one or more of the multiple of image representations other than the user selected one of the multiple image representations in the page view while the first product design is displayed in the same page view.

3. The computer-implemented method of claim 1, wherein the first product design and the second product design both incorporate at least one common picture and have different product layouts.

4. The computer-implemented method of claim 1, wherein the first product design and the second product design have a same product layout and incorporate different pictures.

5. The computer-implemented method of claim 1, further comprising:
   displaying a rotation guide in association with the first product design, wherein the first product design comprises a plurality of perspective views; and
   allowing the user to select one of the perspective views of the first product design using the rotation guide.

6. The computer-implemented method of claim 1, further comprising:
   automatically selecting, by the computer system, one or more user pictures to be incorporated into the group of product designs in association with the image representation.

7. The computer-implemented method of claim 1, wherein t receiving a user's selection of one of the multiple image representations comprises tapping a touch sensitive display device or moving a cursor over the image representation by a user.

8. The computer-implemented method of claim 1, wherein the step of receiving a first selection in the navigation panel comprises tapping a touch sensitive display device or moving a cursor over the first selection in the navigation panel by a user.

9. The computer-implemented method of claim 1, wherein the navigation panel includes a linear array of grids that define the plurality of selections each associated with one of the product designs.

10. The computer-implemented method of claim 1, wherein the navigation panel includes a two-dimensional array of grids that define the plurality of selections each associated with one of the product designs.

11. The computer-implemented method of claim 1, wherein the image representation includes a thumbnail image of the product type.

12. The computer-implemented method of claim 1, wherein the image representation is a perspective view of the product type.

13. The computer-implemented method of claim 1, wherein the computer system includes a mobile device.

14. The computer-implemented method of claim 1, wherein the graphic user interface is enabled by a web browser, a client application, or a native application.

15. The computer-implemented method of claim 1, wherein the page view includes a web page in a web browser or a screen on a device.

* * * * *